(12) United States Patent
Marchand (10) Patent No.: US 12,044,263 B2
(45) Date of Patent: Jul. 23, 2024

(54) SCREW ELEMENT AND SYSTEM FOR FASTENING A LIQUID-CONDUCTING LINE

(71) Applicant: Amfomed AG, Allschwil (CH)

(72) Inventor: Claude Marchand, Holstein (CH)

(73) Assignee: AMFOMED AG, Allschwil (CH)

( * ) Notice: Subject to any disclaimer, the term of this patent is extended or adjusted under 35 U.S.C. 154(b) by 736 days.

(21) Appl. No.: 17/129,132

(22) Filed: Dec. 21, 2020

(65) Prior Publication Data

US 2021/0215187 A1 Jul. 15, 2021

(30) Foreign Application Priority Data

Dec. 20, 2019 (DE) .......................... 102019135455.2

(51) Int. Cl.
*F16B 31/02* (2006.01)
*F16B 31/04* (2006.01)
*F16L 19/028* (2006.01)

(52) U.S. Cl.
CPC ............ *F16B 31/027* (2013.01); *F16B 31/04* (2013.01); *F16L 19/0286* (2013.01)

(58) Field of Classification Search
CPC ...... F16B 31/02; F16B 31/027; F16B 21/186; F16B 21/18; F16B 43/007
USPC .............................. 411/1, 6, 7, 517, 539, 540
See application file for complete search history.

(56) References Cited

U.S. PATENT DOCUMENTS

| | | | | | |
|---|---|---|---|---|---|
| 2,026,454 | A | * | 12/1935 | Benzing | F16B 21/186 301/5.21 |
| 3,181,852 | A | * | 5/1965 | Paller | B60G 15/063 403/375 |
| 3,273,443 | A | * | 9/1966 | Rubin | F16B 31/02 411/7 |
| 4,512,697 | A | * | 4/1985 | Cascini | F16B 31/02 411/7 |
| 5,836,844 | A | * | 11/1998 | Yoshida | B62M 9/125 411/539 |

(Continued)

FOREIGN PATENT DOCUMENTS

DE 102011106696 A1 1/2013

OTHER PUBLICATIONS

EP Office Action and Extended Search Report, Application No. 20215952.1, dated Apr. 28, 2021.

(Continued)

*Primary Examiner* — Flemming Saether
(74) *Attorney, Agent, or Firm* — Vivacqua Crane, PLLC (57) ABSTRACT

The invention relates to a screw element comprising an internal torque limitation for fastening a liquid-conducting line to a device connector or to a coupling for a further line, said screw element having a connection part, which preferably has a thread, and an actuation part; and having a torque limiting unit that limits a torque that can be transmitted from the actuation part to the connection part, wherein the torque limiting unit is arranged between the connection part and the actuation part and has a limiting element, in particular a separate limiting element, that can be assembled from at least two limiting element parts connectable to one another and that limits the torque limiting unit in an axial direction of a longitudinal axis of the screw element. The invention further relates to a system comprising at least one screw element and a line fastened to the screw element.

18 Claims, 6 Drawing Sheets

(56) References Cited

U.S. PATENT DOCUMENTS

| | | | | |
|---|---|---|---|---|
| 9,506,491 B1* | 11/2016 | Lewis | ............... | F16B 31/027 |
| 10,035,467 B2* | 7/2018 | Flaherty | ............... | B60R 9/048 |
| 10,144,359 B2* | 12/2018 | Zander | ............... | F16B 2/02 |
| 10,407,239 B2* | 9/2019 | Fang | ............... | B65D 88/1656 |
| 11,149,883 B2* | 10/2021 | Gauss | ............... | F16B 1/0071 |
| 2006/0182518 A1* | 8/2006 | Underwood | ............... | F16B 43/007 |
| | | | | 411/539 |
| 2013/0076030 A1* | 3/2013 | Fog | ............... | F16L 19/07 |
| | | | | 285/362 |
| 2016/0193969 A1 | 7/2016 | Johansson | | |
| 2016/0356408 A1 | 12/2016 | Sneh et al. | | |

OTHER PUBLICATIONS

DE Office Action and Extended Search Report, Application No. 102019135455.2, dated Sep. 30, 2020.

* cited by examiner

SCREW ELEMENT AND SYSTEM FOR FASTENING A LIQUID-CONDUCTING LINE

INTRODUCTION

The present invention relates to a screw element comprising an internal torque limitation for fastening a line, in particular a liquid-conducting line, to a counter-piece, in particular to a device connector or to a coupling for a further line, said screw element having a connection part, which preferably has a thread, and an actuation part. The invention further relates to a system comprising at least one screw element and a line fastened to the screw element.

Screw elements that serve for the fastening of a line to a counter-piece, whether to a connection part to a further line or to a connector at a housing of a device or a pneumatic or hydraulic device, are known in a large variety. The connectors can be inlets or outlets. The lines can be composed of metal and/or of plastic and can be rigid or flexible. The screw elements can have the shape of hollow bolts or screw sockets or can be configured as sleeve nuts.

The lines composed of plastic are frequently beaded over outwardly at their free ends to form a flange that simultaneously acts as a seal. The end face of the screw element usually presses against a support ring that in turn presses against the flange directly or via a seal and presses said flange against the base surface of a connection bore. In particular in the case of plastic lines that are, for example, composed of PTFE or FEP, the contact pressure at the flange must be kept within limits since the plastic material otherwise starts to flow in an unwanted manner.

In particular in the field of analytical, preparative, or industrial chromatography and the field of medical diagnostics and in laboratory equipment in general, tubes composed of plastic which are relatively thin, but some of which are under high pressure during operation are frequently connected to the corresponding devices, for example to HPLC-MPLC devices or LPLC devices or chromatography columns, by means of screw elements composed of plastic.

In this respect, a considerable number of lines can be connected to a device. As a rule, the screw elements are tightened by hand, i.e. with the fingers. However, it also occurs that the accessibility of the screw elements is difficult due to the tight space conditions. It can by all means occur in this respect that corresponding screw elements can only always be rotated over small angular ranges. It may then be necessary to use a tool to tighten the screw elements sufficiently.

Regardless of whether the screw elements are tightened by hand or with a tool, it is necessary to ensure that the screw elements are screwed sufficiently tight. However, they may not be screwed so tight that the thread of the screw element, which is frequently composed of plastic, is damaged or so tight that the sealing of the plastic tube is no longer ensured, whether by deformation or damage of the tube and/or of a seal provided.

It is therefore the underlying object of the present invention to provide a screw element of the initially mentioned kind that enables a reliable tightening in a simple manner and at the same time protects against too firm a tightening, said screw element can be manufactured in a simple, reliable, and inexpensive manner.

This object is satisfied by a screw element having the features of the independent claim 1. The screw element in accordance with the invention in particular has a torque limiting unit that limits a torque that can be transmitted from the actuation part to the connection part, wherein the torque limiting unit is arranged between the connection part and the actuation part and has a limiting element, in particular a separate limiting element, that can be assembled from at least two limiting element parts connectable to one another and that limits the torque limiting unit in an axial direction of a longitudinal axis of the screw element.

The connection part and the limiting part can indeed be rotatable about the longitudinal axis of the screw element, in particular relative to one another, but they can be axially connectable to one another via a connection point. Accordingly, the total screw element can be rotated about the longitudinal axis in order, for example, to be screwed to a device connector. Due to the axial connection to the connection part, this movement can be easily transmitted to the connection part. The axial connection therefore keeps the actuation part and the connection part beside one another as long as the applied torque does not exceed a certain limit value. However, if this limit value is exceeded, the axial connection can be disconnected and the actuation part can rotate relative to the connection part so that the connection part no longer performs any movement even though the user continues to turn at the actuation part. The limit value for the applied torque can substantially be defined by the torque limiting unit.

The user can thus turn the screw element manually or with the aid of a tool so far into the device connector as long as the torque limiting unit allows this. The torque limiting unit then prevents a screw element from being tightened further such that it and/or the connector is/are damaged in that, for example, the actuation part rotates relative to the connection part. It can be prevented by the internal torque limitation that the connection part subsequently rotates further and that too high a torque is produced there, which can result in damage to the components.

Since the torque limiting unit can be assembled from at least two limiting elements connectable to one another, the screw element can be manufactured in a simpler, more reliable and less expensive manner overall than comparable, known screw elements. The limiting elements can in particular be manufactured separately and can only subsequently be attached to the screw element.

In addition, the handling of screw element has also been found to be comparatively simple due to its formation by means of a connection part, an actuation part and a torque-limiting unit since a user no longer necessarily needs special tools to fasten the screw element to a corresponding connector. The screw element can also easily be manually fastened since the torque limiting unit ensures that a certain torque is not exceeded.

SUMMARY

In accordance with a first embodiment, the limiting element is assembled, in particular releasably or non-releasably assembled, in at least one groove provided at the connection part, preferably in two to six grooves, particularly preferably in four grooves. One or more grooves at the connection part enable a particularly simple and simultaneously exact alignment and arrangement of the torque limiting unit at the connection part since the torque limiting unit only has to be inserted or fastened in the groove or grooves. It is also conceivable that the groove or grooves merely serve as alignment means in which the limiting parts are inserted before they are fastened to one another and are thereby fixed to the connection part. This can, for example, be the case when the limiting parts are arranged around the connection part at the peripheral side.

In accordance with a further embodiment, the torque limiting unit is arranged in the actuation part and the limiting element terminates the actuation part toward a first side in the axial direction of the longitudinal axis. In this respect, the screw element can be manufactured in a particularly simple manner.

In accordance with a further embodiment, the torque limiting unit has a tension spring that is at least sectionally arranged between the actuation part and the connection part to produce a preload between the connection part and the actuation part. The actuation part can thus be rotated against the spring force of the tension spring to further tension the tension spring.

For this purpose, the tension spring can be held by the torque limiting unit at its end remote from the actuation part in order to increase the tension of the tension spring on the rotation of the actuation part. If the tension rises above a limit value, the actuation part can then, for example, rotate relative to the connection part to relax the tension spring again and at the same time to prevent an overtightening of the connection part and thus of the screw element. Damage to the screw element or to the counter-piece can hereby be reduced or even completely avoided.

The tension spring preferably contacts the limiting element.

In accordance with yet a further embodiment, the tension spring is configured as a helical spring, a plate spring, a spiral spring, a Belleville spring, or a leaf spring. Depending on requirements, the corresponding spring can be selected.

In an embodiment, provision can be made that the torque limiting unit has an entrainment element that can be at least sectionally arranged between the connection part and the actuation part and that transmits a movement of the actuation element to the connection element. On the movement or rotation of the actuation part, its movement can thus be directly or indirectly transmitted to the connection part so that the latter also moves or rotates. Equally, due to the entrainment element, the actuation part and the connection part can be fixedly connected to one another as long as the applied torque is below a certain limit value, whereas a movement of the two components relative to one another is made possible at an applied torque that is (too) high.

Provision can additionally be made that the entrainment element is arranged between the actuation part and—if present—the tension spring in order to also transmit the spring force of the tension spring between the connection part and the actuation part.

A further embodiment provides that the entrainment element has entrainment projections at at least one side, said entrainment projections being able to be brought into an operative connection with corresponding recesses provided at the connection part, in particular wherein the entrainment projections extend in parallel with the longitudinal axis. The entrainment element can be arranged between the connection part and the actuation part to assist the transmission of the movement of the actuation part to the connection part.

For this purpose, the entrainment element can, for example, have the entrainment projections at its side remote from the thread so that they are in operative connection with the correspondingly corresponding recesses of the connection part. The entrainment projections together with the corresponding recesses fix the connection part to the actuation part as long as the applied torque is below a certain threshold value. If the applied torque exceeds this threshold value, the actuation part can rotate relative to the connection part, whereby the entrainment projections of the entrainment element each slip from one recess into the adjacent recess in order initially to come to rest again there. The connection part does not move any further during this process and thus prevents an overtightening of the screw element.

In accordance with a further embodiment, the entrainment element has actuation projections at a peripheral side, said actuation projections being able to be brought into an operative connection with corresponding cutouts provided at the actuation part, in particular wherein the actuation projections extend radially to the longitudinal axis. The actuation projections can enter into substantially the same operative connection with the actuation part as, for example, the entrainment projections enter into with the recesses of the connection part. Both the transmission of the movement of the actuation part to the connection part is hereby assisted and a relative rotation with respect to one another is made possible to protect the screw element from possible damage.

An embodiment also provides that the entrainment element is substantially annular. Thus, the entrainment element can, for example, be arranged around the connection part at the peripheral side. The possibly present entrainment projections or actuation projections can then extend axially or radially to the annular entrainment element or to the longitudinal axis of the screw element.

It is also conceivable that the connection part has a flange that serves as a boundary for the actuation part and that thus terminates the actuation part toward a second side in the axial direction of the longitudinal axis. The flange can, for example, be arranged at that side of the connection part that is remote from the thread and that so-to-say faces in the direction of the user to serve as a boundary there. In principle, however, it is also possible for a flange to be formed at both end sides of the connection part.

An embodiment provides that the flange has recesses that in particular correspond to the entrainment projections of the entrainment element, in particular wherein the recesses extend in parallel with the longitudinal axis. Thus, it can, for example, be made possible that the recesses correspond to the entrainment projections of the entrainment element and to enter into an operative connection with the recesses.

In accordance with an embodiment, the limiting element has an at least substantially annular outer periphery in an assembled state.

In accordance with a further embodiment, the limiting element has an at least substantially square inner periphery in the assembled state in order, for example, to better fit into the grooves of the connection part. They can namely, for example, be formed as flattened depressions so that the inner periphery of the limiting element also requires flat sides for an ideal fit.

An embodiment also provides that, in the assembled state, the limiting element has a peripheral groove, in particular a throughgoing peripheral groove, in which a recognition element or a holding element can be fixed. The recognition element can, for example, be configured as a (color) coded recognition element so that a user can, for example, easily recognize which screw element belongs in which connector. Alternatively or additionally, a holding element can also be provided that holds the limiting element parts together in the assembled state and firmly fixes them. In addition, it is also possible for one and the same element to take over both the function of a recognition element and of a holding element.

It is also conceivable that the recognition element is designed as a coding ring that can be embedded in the peripheral groove. The recognition element can hereby also additionally simply take over the function of the holding element since the ring is attached around the assembled limiting element parts at the peripheral side and can thereby hold them together.

Yet a further embodiment provides that the limiting element parts are connected to one another via a plug-in connection, a snap-in connection, a screw connection, a tongue and groove connection, and/or an adhesive connection and/or the like to ensure a simple and simultaneously reliable fixing to one another.

In accordance with an embodiment, the actuation part is manually actuable to ensure a particularly easy handling.

In accordance with an embodiment variant, the actuation part is configured as a sleeve that forms a housing for the torque limiting unit, wherein the housing is terminated at the first side by the limiting element and is terminated at the second side by the actuation part.

In accordance with a further aspect, the present invention relates to a system comprising at least one screw element and a line, in particular a liquid-conducting line, fastened or fastenable to the screw element, wherein the system can also comprise a device connector for a liquid-conducting apparatus with which the screw element cooperates.

BRIEF DESCRIPTION OF THE DRAWINGS

The invention will be explained in more detail in the following with reference to embodiments and to the drawings. In these, there are shown:

FIGS. 1a and b: a screw element in accordance with the invention with and without an actuation part respectively;

FIGS. 6a and b: an exemplary entrainment element;

FIGS. 7a and b: a side view and a cross-section of an exemplary connection part;

FIGS. 10a and b: different cross-sections of an exemplary actuation part;

FIGS. 11a and b: different perspective views of an exemplary actuation part;

FIGS. 12a and b: a perspective view and a side view of an exemplary limiting element part.

DETAILED DESCRIPTION

Figure 1:
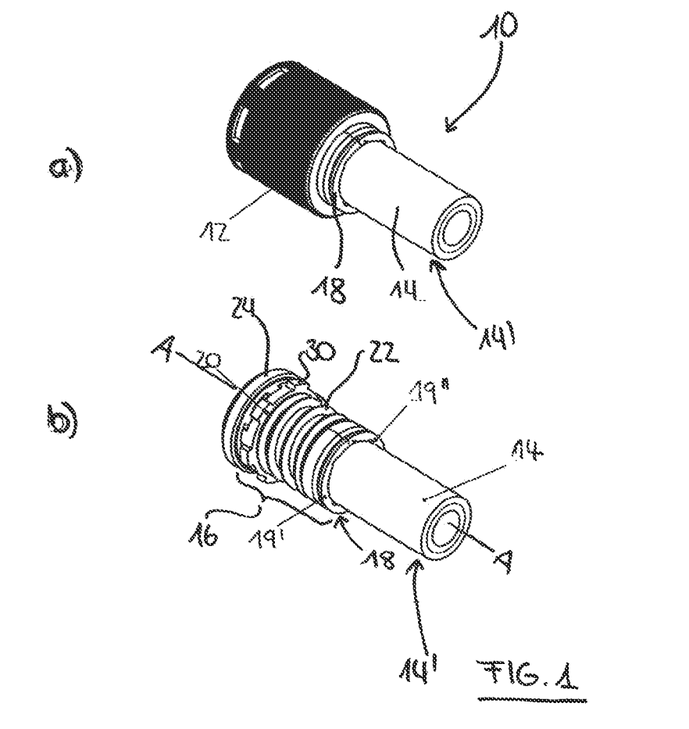

FIGS. 1a and 1b show by way of example a screw element 10 in accordance with the invention, wherein the screw element 10 is shown with the actuation part 12 and the connection part 14 in FIG. 1a. Whereas the actuation part 12 is absent in FIG. 1b so that the torque limiting device 16 disposed therebeneath is visible with its limiting element 18, entrainment element 20, and tension spring 22.

For the sake of simplicity, the connection part 14 is shown without a thread, but it generally has a thread at least at its free end 14' by which it can be screwed into a connector of a device or the like.

The connection part 14 is additionally substantially configured as a hollow cylinder at whose one end a flange 24 is formed that has recesses 26. The flange 24 serves both as a boundary for the actuation part 12 and, via its recesses 26, as a connection to the entrainment element 20. The connection part 14 has a longitudinal axis A that extends between the flange 24 and the free end 14'.

Figure 6:
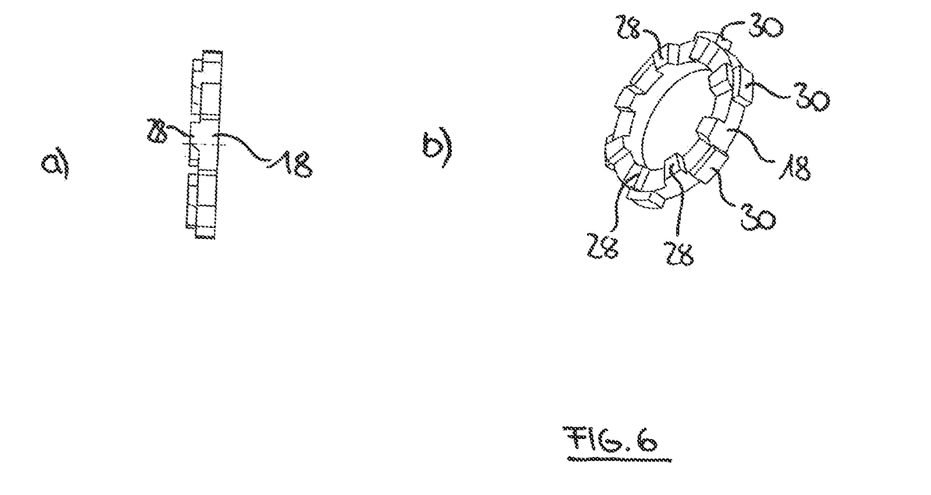

The entrainment element 20 namely has entrainment projections 28 (see also FIGS. 6a and b) that correspond to the recesses 26 at the flange 24 and that can enter into an operative connection. In addition, the entrainment element 20 also has actuation projections 30 that extend radially outwardly. These actuation projections 30 in turn cooperate with the corresponding cutouts 32 at the actuation part 12 (see also FIG. 11b).

Thus, the entrainment element 20 serves as a connection between the connection part 14 and the actuation part 12 and can transmit movements of the one component to the other component in each case or can fix the two components to one another. At the same time, however, this fixing only lasts as long as a certain threshold value of an applied torque is not exceeded. If this threshold value is exceeded, the entrainment element 20 can allow a movement between the actuation part 12 and the connection part 14 in that the projections 28, 30 slide further by a respective recess 26 or cutout 32.

The threshold value for the applied torque is inter alia defined by the spring force of the tension spring 22. This tension spring 22, which is arranged between the connection part 14 and the actuation part 12, namely produces a preload between the two components. If the screw element 10 is screwed into a connector and reaches its geometric limits there, the actuation part 12 can be rotated further against the spring force of the tension spring 22, which is bounded by the limiting element 18, until the actuation part 12 yields at the entrainment element 20 and slides further by one position and thus returns the tension spring 22 to its starting position again.

Figure 2:
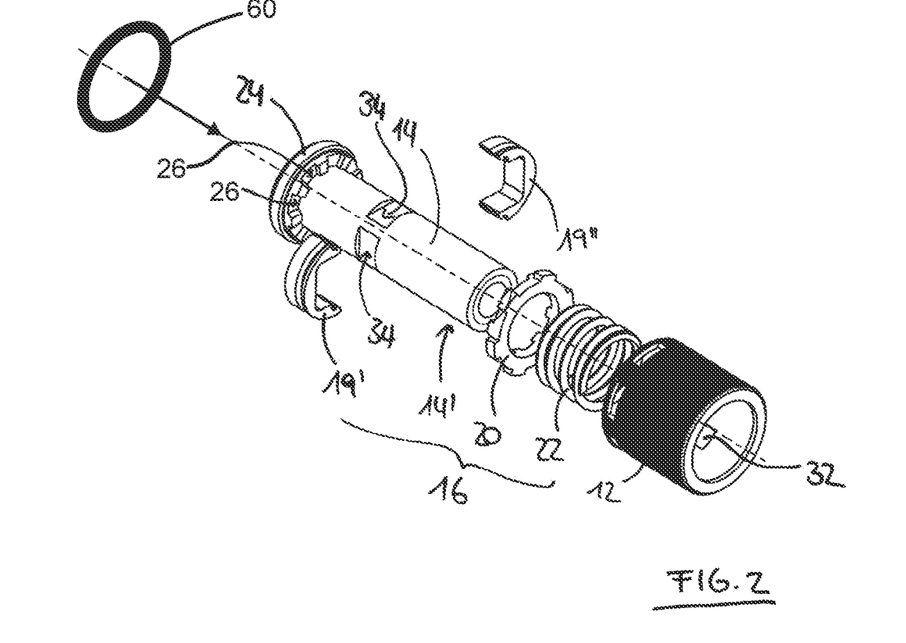
FIG. 2 an exploded view of a screw element in accordance with the invention.
Figure 12:
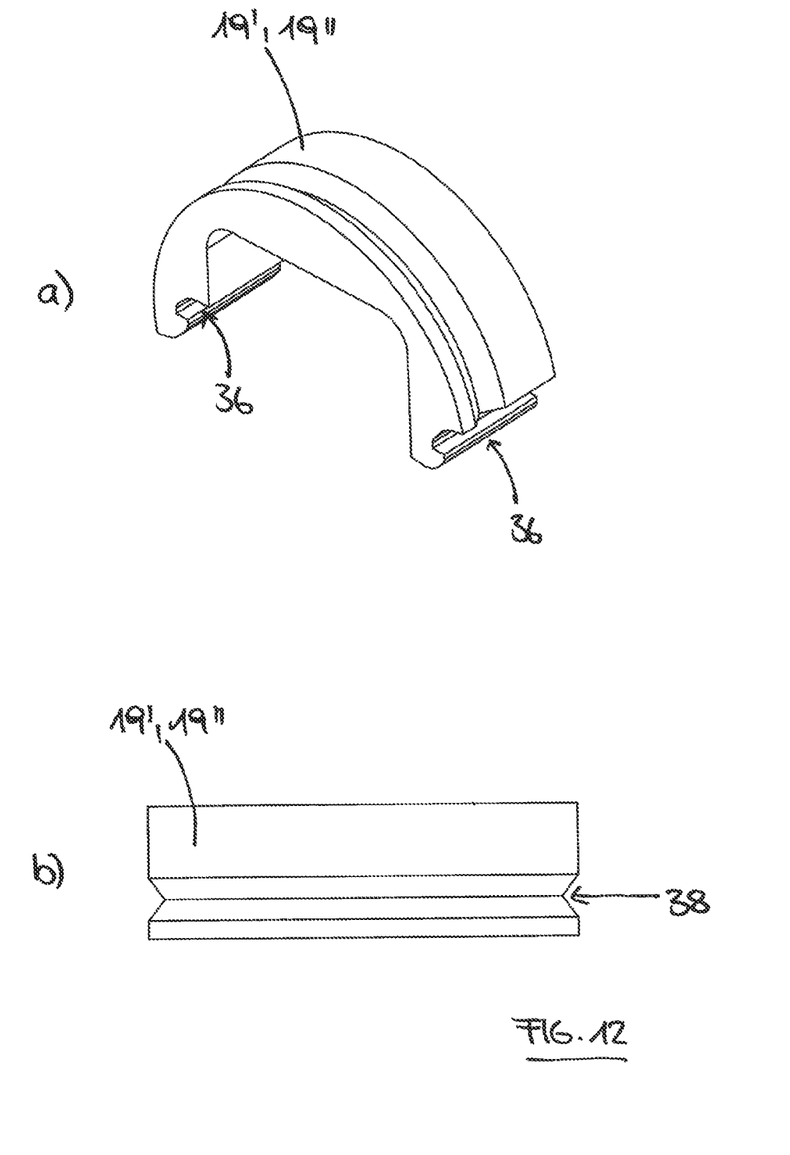

In the embodiment shown, the limiting element 18 is assembled from two limiting element parts 19', 19" (see FIGS. 2 and 12a and b). In principle, however, the limiting element 18 could also comprise a plurality of parts. The multi-part design has in particular proved to be particularly advantageous in that the limiting element 18 can be manufactured as a separate component that is only fastened to the connection part 14 in a further step by fixing the different limiting element parts 19', 19" to one another in a simple manner. In this respect, the screw element can be manufactured in a simple, reliable, and inexpensive manner.

To fasten or align the limiting element 18, a total of four grooves 34 are provided at the connection part 14 that extend around the connection part 14 at the peripheral side. The limiting element parts 19', 19" can be placed in these grooves since, in the assembled form, they have a square inner periphery 40 (see in particular FIG. 4) that corresponds to the grooves 34 of the connection part 14.

In the embodiment shown (see in this respect also FIGS. 12a and b), the limiting element parts 19', 19" are symmetrical and complementary to one another and, in the assembled form, they form an annular outer periphery and a square inner periphery in order—as already mentioned—to be able to be inserted flush into the grooves 34 provided for this purpose. The two limiting element parts 19', 19" can be connected to one another or fastened to one another via a snap-in connection 36. The connection 36 does not necessarily have to be a snap-in connection, but can also be implemented in a different way if this is, for example, simpler and/or more favorable from a technical manufacturing aspect. The snap-in connection 36 shown is merely of an exemplary nature.

Figures 3, 4, 5:
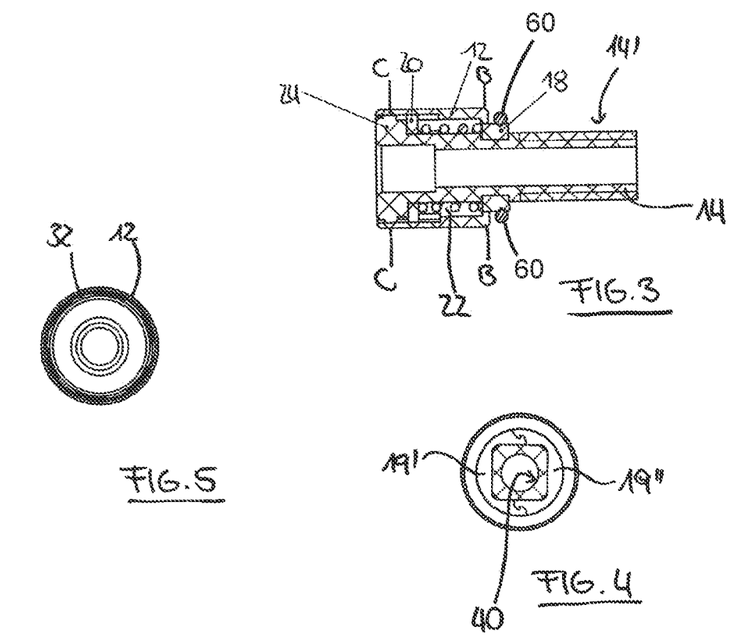
FIG. 3: a cross-section of a screw element in accordance with the invention along the line A-A of FIG. 1b.
FIG. 4: a cross-section of a screw element in accordance with the invention along the line B-B of FIG. 3.
FIG. 5: a cross-section of a screw element in accordance with the invention along the line C-C of FIG. 3.

The outer or inner periphery of the assembled limiting element 18 can be clearly recognized at the cross-section along the line B-B of FIG. 3 in FIG. 4. FIG. 5 shows a further cross-section (along the line C-C of FIG. 3) of the screw element 10 in which, above all, the actuation part 12 with its cutouts 32 can be recognized.

In addition, in its assembled form, the limiting element 18 has a peripheral groove 38 in which a coding ring 60 can be placed. In this respect, the coding ring 60 can serve not only as a—13 for example colored—recognition feature for the screw element, but also as an additional fixing for the two limiting element parts 19', 19". Since the coding ring 60 is namely placed around the assembled limiting element parts 19', 19", it can hold the two parts 19', 19" together in addition to the anyway present snap-in connection 36.

An exemplary limiting element part 19', 19" is shown in FIGS. 12a and 12b. The peripheral groove 38, the annular outer periphery, and the angular inner periphery can be clearly recognized in these Figures.

Figure 7:
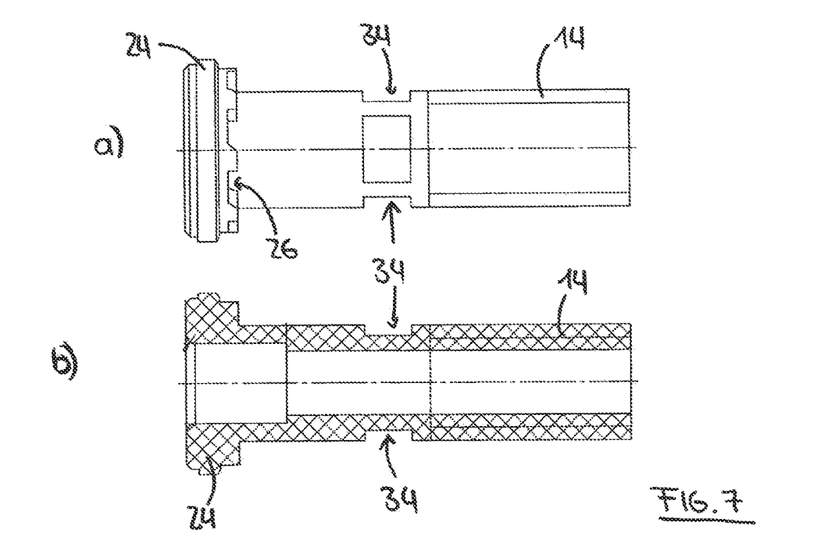
Figure 8:
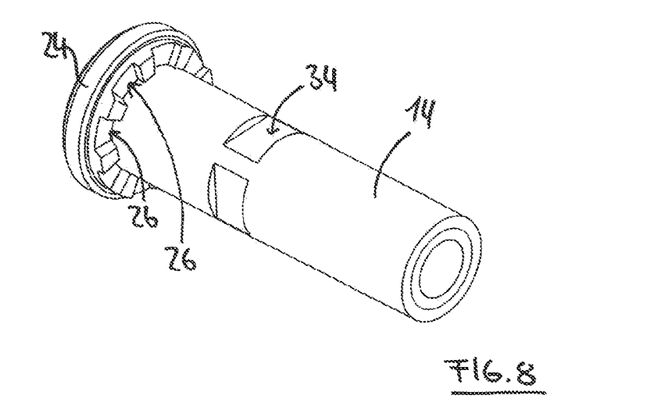
FIG. 8: a perspective view of the connection part of FIG. 7.

In addition, the groove 38 in accordance with the invention of the connection part 14 in which the limiting element 18 is placed can be clearly recognized in FIGS. 7a and b and FIG. 8. In principle, it could also be two grooves, more than four grooves or only one throughgoing peripheral groove. This can be selected and designed as required depending on the design of the limiting element 18.

Figure 9A:
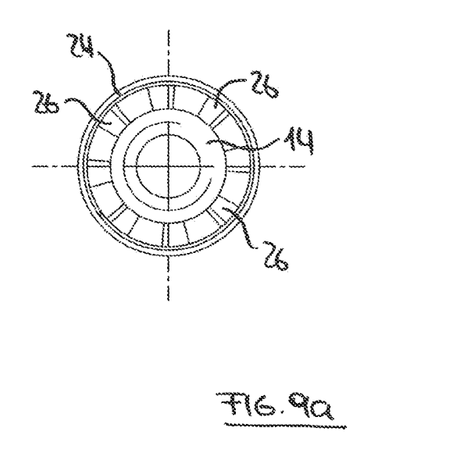
FIGS. 9a and b: different cross-sections of the connection part of FIG. 7.
Figure 9B:
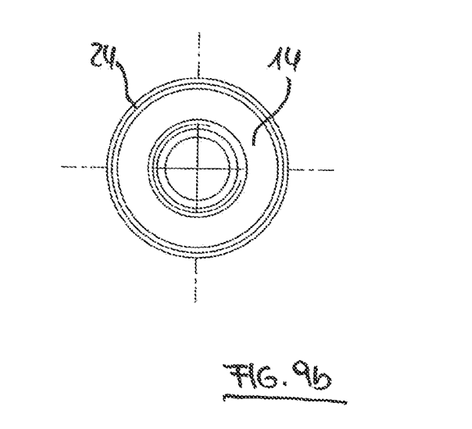

FIGS. 9a and 9b additionally show two cross-sections of the connection part 14 in different planes in which the designs of the flange 24 or of the recesses 26 can be recognized.

In contrast, different cross-sections and views of the actuation part 12 are shown in FIGS. 10a and 10b and 11a and 11b respectively. In the two views of FIGS. 11a and b, it can be clearly recognized that the actuation part 12 has a grooved or fluted surface. This does not represent a technically necessary feature, but it has proven to be particularly advantageous in practice since the grip for the user thus improves. The screw element 10 in accordance with the invention namely has, among other things, proven to be particularly easy to handle since it can be manually actuated by the user and no special tools are necessary. However, the grip of the actuation part 12 can in principle also be improved via other embodiments and methods.

Figure 10:
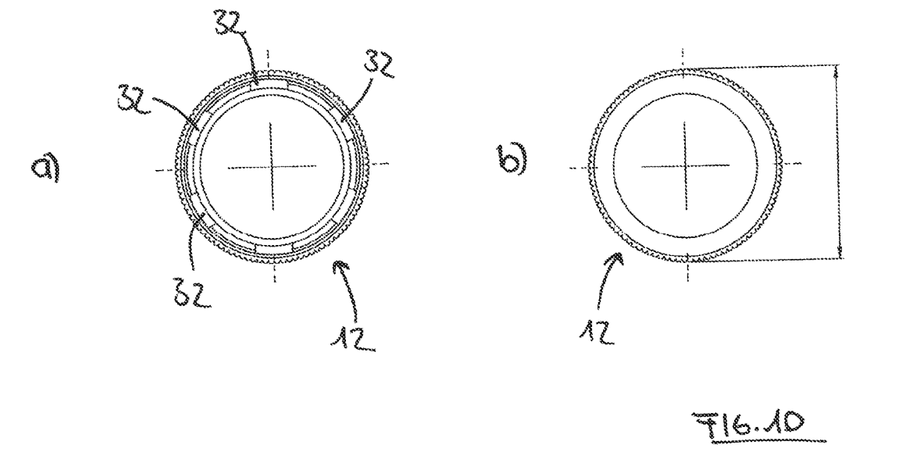
Figure 11:
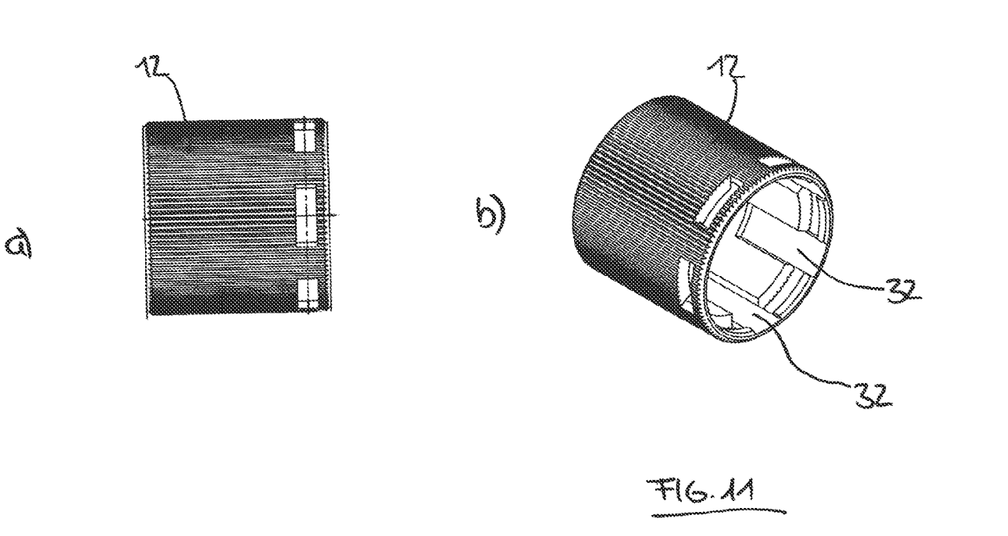

In addition, the cutouts 32 of the actuation part 12, which are in connection with the actuation projections 30 of the entrainment element 20 in the assembled state, can be seen in FIGS. 11b and 10a. FIG. 10b shows a cross-section of the actuation part 12 at a plane of the actuation part 12 at which no cutouts 32 are present anymore. In the embodiment shown, the cutouts 32 namely do not extend over the total length of the actuation part 12, but only over a part relevant for the entrainment element 20. In general, however, the cutouts could also extend over the total length of the actuation part 12.

On the use of the screw element 10 in accordance with the invention, the connection part 14 is therefore screwed into a connector substantially by actuating or rotating the actuation part 12. The connection part 14 can be screwed so far into a connector as the thread (not shown) allows. So that a user does not screw the screw element 10 beyond this and thereby damage the thread and/or the connector, a torque limiting unit 16 is provided between the connection part 14 and the actuation part 12.

The torque limiting unit is assembled from a multi-part limiting element 18, an entrainment element 20, and a tension spring 22. In this respect, the substantially annular limiting element 18 is assembled from two limiting element parts 19', 19" and is fastened in corresponding grooves 34 at the connection part 14. The entrainment element 20 is likewise substantially annular and is arranged around the connection part 14, between the limiting element 18 and the flange 24.

The entrainment element 20 additionally has entrainment projections 28 and actuation projections 30 that cooperate with correspondingly corresponding recesses 26 at the connection part 14 and cutouts 32 at the actuation part 12. Thus, the movement of the actuation part 12 can be transmitted to the connection part 14 on the actuation of the actuation part 12. However, at the same time, this connection is releasable such that an overtightening of the screw element 10 can be avoided. Before an overtightening can namely take place at all, this connection between the entrainment element 20, the connection part 14, and the actuation part 12 gives way and the projections 28, 30 of the entrainment element 20 each slip further by one recess 26 or one cutout 32 so that a rotation of the actuation part 12 relative to the connection part 14 takes place, wherein the connection part 14 does not move.

A tension spring 22 is additionally provided between the connection part 14 and the actuation part 12 and preloads the two parts 12, 14 with respect to one another. The spring force of this tension spring 22 can then substantially define the limit value for the applied torque at which the torque limiting unit 16 is triggered and allows a movement of the actuation part 12 relative to the connection part 14. The actuation part 12 can namely be rotated further against the spring force of the tension spring 22. As soon as the threshold value of the applied torque is reached, the torque limiting unit 16 is triggered so that the tension spring 22 relaxes again and returns to its starting position.

Figure 13:
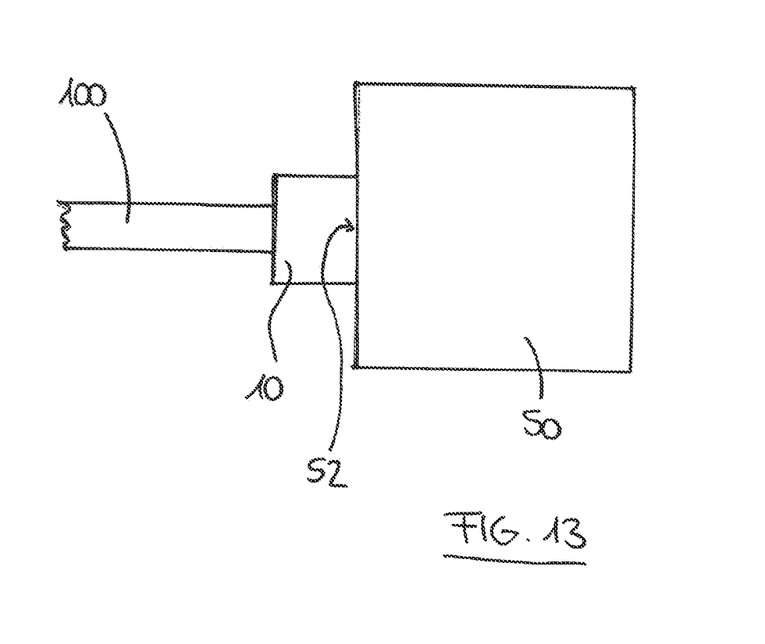
FIG. 13 a perspective view of a line that is connected to a housing by means of a screw element in accordance with FIG. 1.

FIG. 13 shows a perspective view of a line 100 that is connected to a housing 50 by means of the screw element 10. For this purpose, the screw element 10 is connected to a device connector 52, for example in the form of an internal thread, of the housing 50. The line 100 is a line which is configured for conducting liquids and by means of which liquids can be conducted to or from the housing 50. The housing 50 can, for example, comprise a column which is used in chromatography and to which or from which a liquid is conducted by means of the line 100. In principle, the housing 50 can comprise any kind of liquid-conducting apparatus to or from which a fluid has to be conducted.

The line 100 can also be connected to a further line by means of the screw element 10 and a coupling, not shown.

REFERENCE NUMERALS 10 screw element
12 actuation part
14 connection part
14' free end
16 torque limiting unit
18 limiting element
19', 19" limiting element part
20 entrainment element
22 tension spring
24 flange
26 recesses
28 entrainment projections
30 actuation projections 32 cutouts
34 groove
36 snap-in connection
38 peripheral groove
40 inner periphery
50 housing
52 device connector
60 coding ring
100 line
A longitudinal axis

The invention claimed is:

1. A screw element comprising:
an internal torque limitation for fastening a line to a counter-piece;
a connection part;
an actuation part; and
a torque limiting unit that limits a torque that can be transmitted from the actuation part to the connection part, wherein the torque limiting unit is arranged between the connection part and the actuation part and has a limiting element that can be assembled from at least two limiting element parts connectable to one another and that limits the torque limiting unit in an axial direction of a longitudinal axis of the screw element, wherein the torque limiting unit has an entrainment element that can be at least sectionally arranged between the connection part and the actuation part and that transmits a movement of the actuation part to the connection part, and wherein the entrainment element has entrainment projections at at least one side, said entrainment projections being able to be brought into an operative connection with corresponding recesses provided at the connection part.

2. The screw element in accordance with claim 1, wherein the limiting element is assembled in at least one groove provided at the connection part.

3. The screw element in accordance with claim 1, wherein the torque limiting unit is arranged in the actuation part and the limiting element terminates the actuation part toward a first side in the axial direction of the longitudinal axis.

4. The screw element in accordance with claim 1, wherein the torque limiting unit has a tension spring that is at least sectionally arranged between the actuation part and the connection part to produce a preload between the connection part and the actuation part.

5. The screw element in accordance with claim 4, wherein the tension spring contacts the limiting element.

6. The screw element in accordance with claim 1, wherein the entrainment element has actuation projections at a peripheral side, said actuation projections being able to be brought into an operative connection with corresponding cutouts provided at the actuation part, wherein the actuation projections extend radially to the longitudinal axis.

7. The screw element in accordance with claim 1, wherein the connection part has a flange that serves as a boundary for the actuation part and that terminates the actuation part toward a second side in the axial direction of the longitudinal axis.

8. The screw element in accordance with claim 7, wherein the flange has recesses.

9. The screw element in accordance with claim 1, wherein the limiting element has an at least substantially annular outer periphery in an assembled state.

10. The screw element in accordance with claim 1, wherein the limiting element has an at least substantially square inner periphery in an assembled state.

11. The screw element in accordance with claim 1, wherein, in an assembled state, the limiting element has a throughgoing peripheral groove, in which a recognition element or a holding element can be fixed.

12. The screw element in accordance with claim 11, wherein the recognition element is designed as a coding ring that can be embedded in the throughgoing peripheral groove.

13. The screw element in accordance with claim 1, wherein the actuation part is manually actuable.

14. The screw element in accordance with claim 13, wherein the actuation part is configured as a sleeve that forms a housing for the torque limiting unit, wherein the housing is terminated at a first side by the limiting element and is terminated at a second side by the actuation part.

15. The screw element in accordance with claim 1, wherein the limiting element is assembled in four grooves provided at the connection part.

16. The screw element in accordance with claim 1, wherein the entrainment projections extend in parallel with the longitudinal axis.

17. A system comprising at least one screw element and a line fastened or fastenable to the screw element, comprising an internal torque limitation for fastening the line to a counter-piece, a connection part, an actuation part; and a torque limiting unit that limits a torque that can be transmitted from the actuation part to the connection part, wherein the torque limiting unit is arranged between the connection part and the actuation part and has a limiting element that can be assembled from at least two limiting element parts connectable to one another and that limits the torque limiting unit in an axial direction of a longitudinal axis of the screw element, wherein the torque limiting unit has an entrainment element that can be at least sectionally arranged between the connection part and the actuation part and that transmits a movement of the actuation part to the connection part, and wherein the entrainment element has entrainment projections at at least one side, said entrainment projections being able to be brought into an operative connection with corresponding recesses provided at the connection part.

18. The screw element in accordance with claim 17, wherein the system has a device connector for a liquid-conducting apparatus with which the screw element cooperates.

* * * * *